United States Patent
Hager et al.

(10) Patent No.: US 6,897,803 B2
(45) Date of Patent: May 24, 2005

(54) RADAR ALTIMETER WITH FORWARD RANGING CAPABILITIES

(75) Inventors: James R. Hager, Golden Valley, MN (US); Larry D. Almsted, Bloomington, MN (US); John H. Keuper, Anoka, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/459,139

(22) Filed: Jun. 11, 2003

(65) Prior Publication Data

US 2004/0252048 A1 Dec. 16, 2004

(51) Int. Cl.$^7$ .............................................. G01S 13/08
(52) U.S. Cl. ........................ 342/120; 342/122; 342/65; 342/189; 342/194
(58) Field of Search ................................. 342/120, 121, 342/122, 65, 189, 194

(56) References Cited

U.S. PATENT DOCUMENTS

| | | | |
|---|---|---|---|
| 2,630,283 A | | 3/1953 | Hanson |
| 3,185,984 A | | 5/1965 | Child et al. |
| 3,206,745 A | * | 9/1965 | Waters .......................... 342/65 |
| 3,277,467 A | | 10/1966 | Barney |
| 3,315,255 A | * | 4/1967 | Sullivan et al. ................ 342/65 |
| 3,373,423 A | | 3/1968 | Levy |
| 3,396,391 A | * | 8/1968 | Anderson et al. ............. 342/65 |
| 3,467,961 A | * | 9/1969 | Follen et al. .................. 342/65 |
| 3,944,968 A | * | 3/1976 | Bateman et al. ............. 340/970 |
| 6,606,034 B1 | * | 8/2003 | Muller et al. ................ 340/970 |
| 6,750,807 B1 | * | 6/2004 | Hager et al. ................. 342/120 |
| 6,753,806 B1 | * | 6/2004 | Hager et al. ................. 342/169 |
| 2003/0184450 A1 | * | 10/2003 | Muller et al. ................ 340/963 |
| 2004/0181318 A1 | * | 9/2004 | Redmond et al. .............. 701/9 |

FOREIGN PATENT DOCUMENTS

| | | |
|---|---|---|
| EP | 0 475 181 A2 | 3/1992 |
| GB | 522 890 A | 7/1940 |

OTHER PUBLICATIONS

International Search Report dated Oct. 14, 2004, Application No. PCT/US2004/018097, 11 pages.

* cited by examiner

Primary Examiner—John B. Sotomayor
(74) Attorney, Agent, or Firm—Matthew Luxton, Esq.; Armstrong Teasdale LLP

(57) ABSTRACT

A method for incorporating a forward ranging feature into a radar altimeter is described. The method comprises positioning an antenna of the altimeter such that a side lobe of a radar signal radiates from the antenna in a forward direction and processing a radar return from the side lobe to determine a range to a forward object.

20 Claims, 2 Drawing Sheets

US 6,897,803 B2

RADAR ALTIMETER WITH FORWARD RANGING CAPABILITIES

BACKGROUND OF THE INVENTION

This invention relates generally to radar altimeters, and more specifically to a radar altimeter with forward ranging capability.

The proper navigation of an aircraft in all phases of its flight is based to a large extent upon the ability to determine the terrain over which it is passing, and further based on the ability to determine a position of the aircraft. In this regard, aircraft instrumentation, sensors, radar systems, and specifically, radar altimeters are used in combination with accurate electronic terrain maps. The electronic terrain maps provide the height of objects on the map, and together with the radar altimeter aid in the flight and the planning of a flight path for the aircraft.

As such, radar altimeters are commonly implemented within aircraft. A radar altimeter typically includes a transmitter for applying pulses of electromagnetic energy at regular intervals to an antenna which then radiates the energy, in the form of a transmit beam, towards the earth's surface. A transmit beam from a radar is sometimes said to "illuminate" or "paint" an area which reflects the transmit beam. Based on a configuration of the antenna, the transmit beam includes a main lobe, and one or more side lobes which are separated from the main lobe by an angle.

The radar altimeter further includes a signal receiver which receives return pulses, sometimes referred to as an echo or a return signal. Return pulses are received at an receive antenna, and constitute transmit beams that have been reflected from the earth's surface. It is known that some radar altimeters utilize antennas for both transmitting and receiving. A closed loop servo tracker for measuring the time interval between the transmitted pulse and its associated return pulse also forms a part of the radar altimeter. The time interval between the transmit pulse and the return pulse is directly related to the altitude of the aircraft.

However, problems still exist with controlled flights into certain terrain. For example, aircraft are sometimes required to fly at very low altitudes. Flying at low altitude increases the probability that certain terrain features are in front of the aircraft, in the flight path, rather than safely below the aircraft, as is the case at normal flight altitudes.

Known radar altimeters utilized in aircraft are generally incapable of detecting objects that are in a flight path. Examples of such objects include, for example, tall buildings, or the side of a cliff. While an aircraft equipped with a radar altimeter can determine an altitude, the aircraft is not able to recognize objects in front of it if not equipped with, for example, a costly scanning laser radar. Problems also exist even when the scanning laser radar is implemented within an aircraft since they are sometimes rendered ineffective when encountering one or more of rain, fog, and smoke.

BRIEF SUMMARY OF THE INVENTION

In one aspect, a method for incorporating a forward ranging feature into a radar altimeter is provided. The method comprises positioning an antenna of the altimeter such that a side lobe of a radar signal radiates from the antenna in a forward direction and processing a radar return from that side lobe to determine a range to a forward object.

In another aspect, a radar altimeter comprising at least one antenna, a range track channel and a forward warning unit is provided. The antenna is for transmitting and receiving radar signals, and the antenna is capable of transmitting a signal having at least one side lobe substantially aligned with a line of flight. The range track channel determines an altitude from the received radar signals, and the forward warning unit also receives radar return signals. The forward warning unit is, however, restricted to processing received radar return signals from side lobe which provides positive doppler shifts.

In still another aspect, a forward warning unit is provided which comprises a range gate and correlator receiving radar return signals, a correlation band pass filter receiving an output of the range gate and correlator, and a base band I/Q mixer downsampling an output of the correlation band pass filter to a doppler frequency. The forward warning unit further comprises a doppler band pass filter filtering an output of the base band I/Q mixer. The forward warning unit is restricted to processing those radar return signals from a side lobe of the radar return signal which has positive doppler shifts.

DETAILED DESCRIPTION OF THE INVENTION

A radar altimeter which provides a forward ranging, or look ahead capability is herein described. In order to provide the forward ranging capability, an antenna of the radar altimeter is configured and positioned such that one of the side lobes of the radar altimeter's transmit beam is transmitted in a direction of travel (typically forward) of the aircraft on which the radar altimeter is mounted. The side lobe is transmitted forward (another side lobe is transmitted rearward), based on the angle of separation between the main lobe and the side lobes. As further described below, the radar altimeter includes a doppler processing circuit which is restricted to processing returns of the side lobe beam that provides a positive doppler shift. A positive doppler shift is typically provided from a side lobe beam that is transmitted along the direction of the line-of-flight of the aircraft.

The radar altimeter therefore provides a down looking altitude function, as is known in the art, based on a main lobe of the transmit beam, along with forward terrain or obstacle warning, based on a side lobe of the transmit beam. The radar altimeter provides the forward warning function while only adding minor additional signal processing functions to the radar altimeter. An area illuminated by the side lobe which provides a positive doppler shift within the radar return is selected by doppler signal processing. The radar altimeter forward looking functionality described herein is therefore similar to the functionality provided by a separate synthetic aperture radar, but without the high costs and weight addition to the aircraft that is introduced by the synthetic aperture radar.

Figure 1:
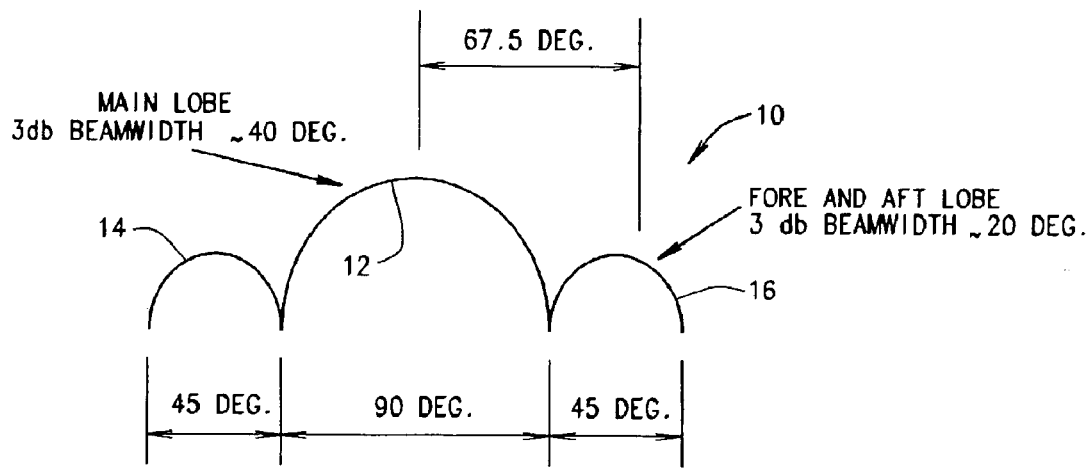
FIG. 1 illustrates a main lobe and two side lobes of a radar beam.

FIG. 1 illustrates a radar beam 10 which includes a main lobe 12 and two side lobes 14, 16. In a typical radar altimeter, main beam 12 has a 3 db width of about 40 degrees. A 3 db width of 40 degrees results in a main lobe 12 null to null width of approximately 90 degrees. Since a side lobe 14, 16 width is one half of the width of main lobe 12, a null to null width of side lobes 14, 16 is about 45 degrees. Therefore, a separation between main lobe 12 and either of side lobes 14, 16 is about 67.5 degrees. As side lobe 14, 16 width is one half of the width of main lobe 12, side lobes 14, 16 have a 3 db width of about 20 degrees.

Figure 2:
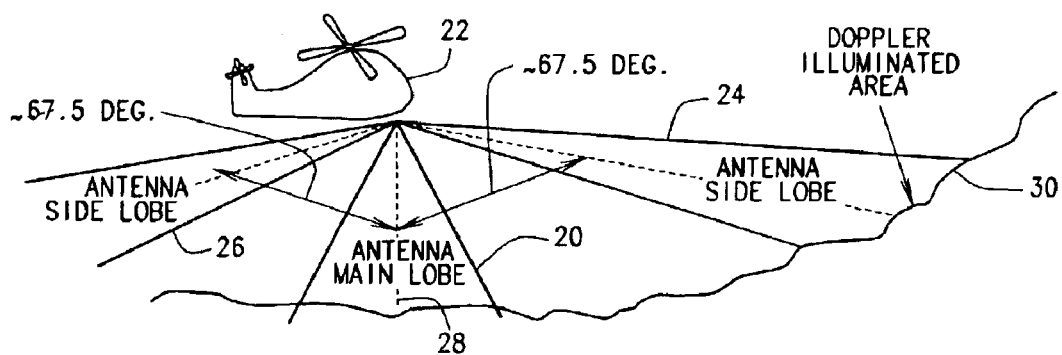
FIG. 2 illustrates the radar beam main lobe and two sides lobes as transmitted from an antenna.

FIG. 2 illustrates a radar beam which includes a main lobe 20 transmitted from an antenna (not shown) mounted on a bottom of aircraft 22 and also includes a forward side lobe 24, and a rear side lobe 26 that are transmitted from the antenna. FIG. 2 also illustrates, for example, the approximate 67.5 degree separation between main lobe 20 and forward side lobe 24. As main lobe 20 is pointing essentially straight down from aircraft 22, forward side lobe 24 is transmitted to (e.g. illuminates) an area from about 57.5 degrees to about 77.5 degrees from a centerline of main lobe 20. The area illuminated by forward looking side lobe 24 (67.5±10 degrees) is typically sufficient to determine if any obstacles are in a line-of-flight of aircraft 22, for example, cliff 30.

In an another embodiment, the antenna of aircraft 10 is skewed several degrees, for example, 10 degrees. For example, by skewing the antenna forward, antenna main lobe 20 is no longer vertical with respect to aircraft 22. Therefore, forward lobe 24 (in the 10 degree skewing example) is transmitted to an area from about 67.5 degrees to about 87.5 degrees, which is substantially horizontal. While in the skewing example, a centerline of main lobe 20 is no longer directly under aircraft 22, the skew is not enough to render ineffective the ranging function that provides an altitude of aircraft 22.

As further described below, the radar altimeter provides a down looking altimeter beam, main lobe 20, along with forward and aft illuminated beams 24, 26, which allows a forward ranging capability by doppler processing positive returns from one of forward lobe 24 and rearward lobe 26. In certain embodiments, rearward lobe 26 could provide the positive doppler returns to be processed. One such example is a helicopter, which is capable of flying backwards.

Figure 3:
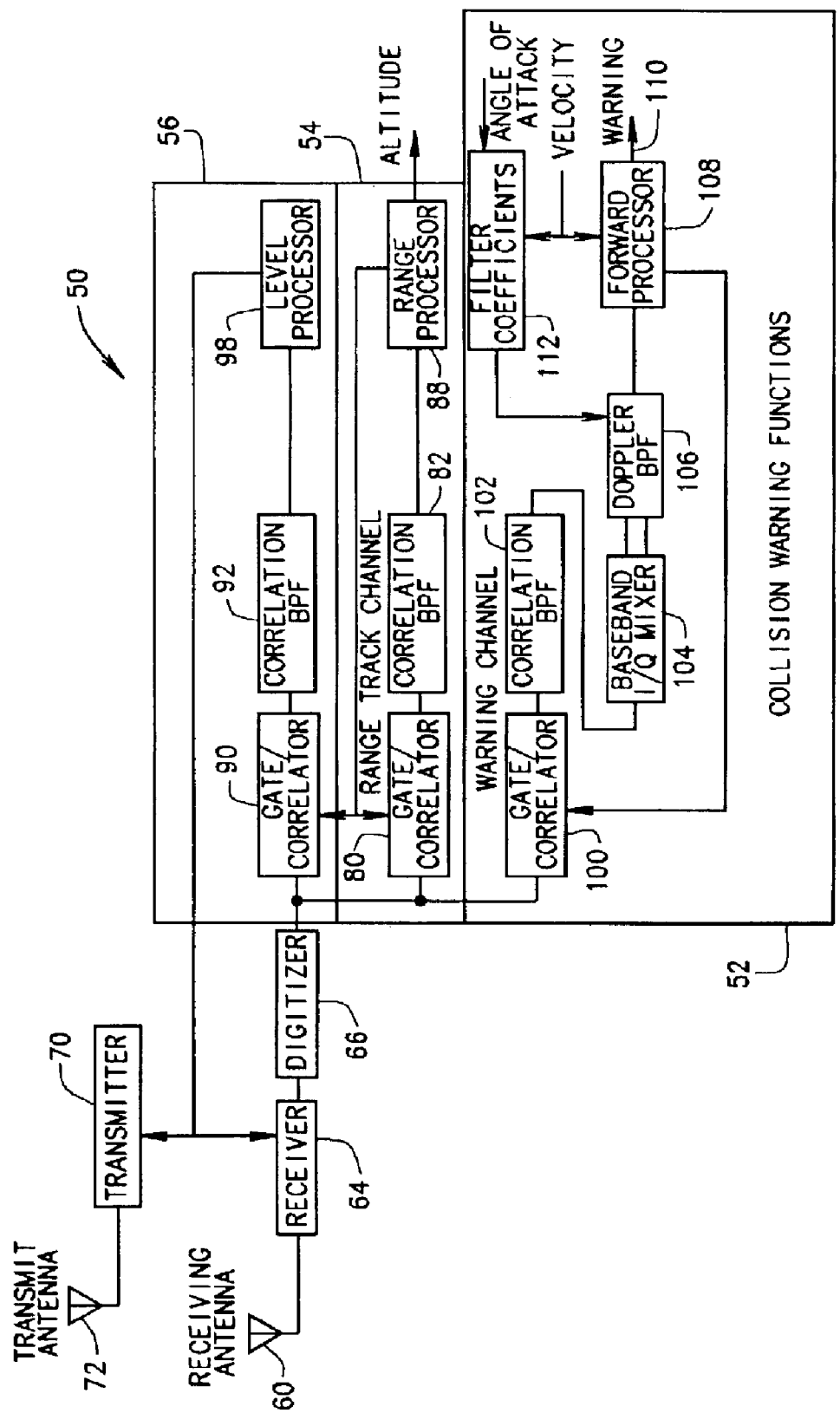
FIG. 3 is a block diagram of a radar altimeter which incorporates signal processing circuitry for processing a side lobe of a radar return.

FIG. 3 is a block diagram of a radar altimeter 50 which incorporates signal processing circuitry, sometimes referred to as a forward warning unit 52, for processing a return from a side lobe of a radar transmit beam. As described above, in one embodiment, forward warning unit 52 processes only those returns with a positive doppler shift. Radar altimeter 50 also includes a range track channel 54 and a level channel 56, as known in the art. In the embodiment shown, radar altimeter 50 includes a receive antenna 60, a receiver 64 connected to antenna 60, and a digitizer 66 connected to receiver 64, all of which are utilized in preprocessing signals received at antenna 60. Radar altimeter 50 further includes a transmitter 70 and a transmit antenna 72. In one embodiment, transmitter 70 includes a power amplifier, a modulator, a single side band (SSB) mixer, and an intermediate frequency (IF) offset generator.

Radar altimeter 50 transmits a modulated radar signal (e.g. transmit pulse) toward the ground from transmit antenna 72. After a radar signal is transmitted by transmit antenna 72, the reflected signals within both a main lobe and side lobes of the antenna are received from the ground below, in front of, and behind the aircraft by receive antenna 60. The received reflected signals are processed through receiver 64 and digitizer 66 before being passed to a range gate and a correlator in each of forward warning unit 52, range track channel 54, and level channel 56. The signals received at receive antenna 60 will include reflections from the main lobe and the side lobes of the transmitted pulse. Embodiments of radar altimeters which utilize a single antenna for both the transmit and receive functions are well known, and are considered to be applicable for the forward ranging functionality described herein with the addition of a circulator or transmit/receive switch to share the single antenna.

As shown in FIG. 3, radar altimeter 50, and specifically, forward warning unit 52, receives air vehicle or aircraft (A/C) vertical and horizontal velocity data and angle of attack from, for example, an inertial navigation system (INS) of the vehicle. Radar altimeter 50 provides above ground level (AGL) altitude data that identifies the vehicle altitude to one or more of a pilot (through a display) and other systems within the vehicle which utilize altitude data.

Range track channel 54 includes a range gate/correlator 80 which receives the digitized radar return signal from digitizer 66. Range track channel 54 also includes a correlation band pass filter (BPF) 82, and a range processor 88, which determines an altitude of the aircraft. Level channel 56 includes a range gate/correlator 90, which also receives the digitized radar return signal from digitizer 66. Gate/correlator 90 also receives an altitude signal from range processor 88. Level channel 56 further includes a correlation band pass filter (BPF) 92, and a level processor 98. Level processor 98 includes a closed loop control function to minimize the transmit power to a level allowing ample signal to noise ratio at the receive circuits. Reduction of transmit power to a minimum required for good operation reduces the ability of detection of transmissions from radar altimeter 50 by other radar receivers.

Forward warning unit 52 includes a range gate/correlator 100 which receives the digitized radar return signal from digitizer 66. Forward warning unit 52 also includes a correlation band pass filter (BPF) 102, a base band IQ mixer 104 which down converts the radar return signal to the base band frequency, and effectively eliminates the negative doppler signal. The filtering and mixing results in only positive doppler returns (e.g. only those returns from the side lobe in the direction of travel) being passed on to a doppler band pass filter 106, and a forward warning processor 108. Forward warning processor 108 provides a warning signal 110, should a forward range to an object in the flight path, as determined by forward warning unit 52, be within a threshold for activating warning 110. One such example of a warning signal 110 might be that altimeter 50, through forward warning unit 52, determines that an object is in the flight path of the aircraft, at a range of 1000 yards.

When a radar signal is transmitted, the return signal comes back at the same frequency as the transmitted signal, plus or minus a doppler shift. The radar return pulse received in a side lobe pointing in the direction of travel will be shifted up in frequency, resulting in a positive doppler signal. The return pulse received in a side lobe pointing in the opposite of the direction of travel, will be shifted down in frequency, resulting in a negative doppler signal. Base band I/Q mixer 104 mixes out the negative doppler signal. By properly adjusting doppler band pass filter 106, any radar return received through the side lobe pointing in the direction of travel can be selected and bounded. For example, only radar return signals that are reflected from the doppler illuminated area from terrain 30 (shown in FIG. 2) will be processed by the forward warning channel 52 by setting the filter 106 center frequency to the doppler calculated from aircraft velocity and angle of attack.

In operation, gate/correlators 90 and 100 are fixed on the nearest target or leading edge of the altitude return. At the same time, range gate/correlator 80 is continuously searching a range to the nearest return in the calculated doppler bound. Range is essentially the same as time (i.e., the time for a return signal to be received). The doppler frequency and bandwidth for doppler BPF 106 is adjusted based on the air vehicle velocity and angle of attack data to obtain the desired doppler illuminated area position on the direction of travel, as illustrated in FIG. 2. For doppler band pass filter 106, the doppler center frequency and bandwidth are adjusted based on air vehicle velocity and angle of attack (i.e. cliff 30).

However, forward warning unit 52 utilizes additional doppler band select functions to restrict its processing to signals representative of a radar return which includes positive doppler shifts, indicative of a direction of flight. In one embodiment, these are the radar return signals from a side lobe of a radar transmit beam, where the side lobe is transmitted generally in a direction of travel. Stated in another way, forward processing unit 52 is restricted to processing radar return signals that are returned from within an illuminated area bounded by the 20 degree forward side lobe 24 (shown in FIG. 2) (e.g. reflections of side lobe 24), and more specifically illuminating only an area which could cause a collision. This is typically on the line of flight with some predetermined margin over the obstacle.

During backward flying maneuvers, rearward side lobe 26 provides positive doppler returns, and forward processing unit 52 is restricted to processing radar return signals that are returned from within an area bounded by the 20 degree rearward side lobe 26 (shown in FIG. 2). Radar returns having a negative doppler shift are suppressed within forward processing unit 52 utilizing base band I/Q mixer 104, and the side lobe indicative of a positive doppler shift is further restricted to the desired angle by doppler band pass filter 106. Aircraft angle of attack, vehicle velocity, and crab angle are monitored to provide filter coefficients 112, based on a determined doppler center frequency, to doppler band pass filter 106.

Operation of forward processing unit 52 is further illustrated through the following calculations, $F_d$=doppler frequency shift on a vector rotated "a" degrees from vertical, in Hertz. V=vehicle velocity in feet/sec. L=wavelength in feet. A doppler frequency shift is therefore, $F_d=(2V/L)\times\sin(a)$ to further illustrate, if V=40 Knots, or 68 Ft/sec, and L=0.229 Ft at a 4.3 GHz radar frequency, then a required doppler center frequency to restrict angle to 75 degrees forward of vertical, assuming flight direction is forward for positive doppler shift, is determined as $F_d=2\times(68/0.229)\times\sin(75)$, or, $F_d$=574 Hz. A doppler bandwidth to provide a two degree wide coverage on the 75 degree doppler vector is calculated as BW=2×(68/0.229)×(sin(76)−sin (74)), or BW=5.4 Hz.

In this example calculation, a velocity measure of 68 Ft/sec is provided by, for example, a vehicle inertial measurement unit (not shown) and filter coefficients 112 are calculated for digital band pass doppler filter 106 based on the velocity and a user desired coverage angle. I/Q mixer 104 attenuates negative doppler returns, resulting in the processing of only positive doppler returns, which are the doppler returns indicative of a direction of travel.

Although not shown, operation of forward processing unit 52 includes controlling a range gate in a continuous search mode, searching from near range out to a far range as determined by vehicle velocity and a desired collision warning time. Detection of a possible collision are provided to the pilot with an audible warning along with a time to impact based on velocity and detected range.

While the invention has been described in terns of various specific embodiments, those skilled in the art will recognize that the invention can be practiced with modification within the spirit and scope of the claims.

What is claimed is:

1. A method for incorporating a forward ranging feature into a radar altimeter, said method comprising:
   positioning an antenna of the altimeter such that a side lobe of a radar signal radiates from the antenna in a forward direction of travel;
   processing a radar return from a main lobe of the radar signal to determine an altitude; and
   processing a radar return from the side lobe to determine a range to a forward object.

2. A method according to claim 1 further comprising attenuating negative doppler returns.

3. A method according to claim 1 wherein said processing comprises:
   applying the radar return to a doppler filter, the doppler filter restricted to processing radar return signals which include positive doppler shifts; and
   processing the radar return based at least in part on vehicle velocity and an angle of attack of the vehicle.

4. A method according to claim 3 wherein said applying comprises configuring the doppler filter with band select coefficients.

5. A method according to claim 1 further comprising providing a warning signal and a time to impact with the forward object signal based at least in part on vehicle velocity and a detected range to the forward object.

6. A radar altimeter comprising:
   at least one antenna for transmitting and receiving radar signals, said antenna transmitting a signal having at least one side lobe substantially aligned with a line of flight;
   a range track channel for determining an altitude from the radar returns; and
   a forward warning unit, said unit receiving radar return signals and restricted to processing radar return signals from the side lobe which provide positive doppler shifts.

7. A radar altimeter according to claim 6 wherein said forward ranging unit comprises:
   a range gate and correlator receiving radar return signals;
   a correlation band pass filter receiving an output of said range gate and correlator;
   a base band I/Q mixer downsampling an output of said correlation band pass filter to a doppler frequency; and
   a doppler band pass filter filtering an output of said base band I/Q mixer.

8. A radar altimeter according to claim 7 further comprising filter coefficients, said filter coefficients restricting said doppler band pass filter to radar return signals from the side lobe which provide positive doppler shifts.

9. A radar altimeter according to claim 6 wherein said forward warning unit suppresses radar return signals with a negative doppler shift.

10. A radar altimeter according to claim 7 further comprising a forward processor, said forward processor providing a warning signal based upon an output of said doppler band pass filter.

11. A forward warning unit comprising:
   a range gate and correlator receiving radar return signals;
   a correlation band pass filter receiving an output of said range gate and correlator;

a base band I/Q mixer downsampling an output of said correlation band pass filter to a doppler frequency; and a doppler band pass filter filtering an output of said base band I/Q mixer, said unit restricted to processing those radar return signals from a side lobe of the radar return signal which has positive doppler shifts.

12. A forward warning unit according to claim 11 wherein said doppler band pass filter comprises filter coefficients, said filter coefficients restricting said doppler band pass filter to filtering those radar return signals from the side lobe which provides positive doppler shifts.

13. A forward warning unit according to claim 11 wherein said coefficients cause said filter to suppress those radar return signals with a negative doppler shift.

14. A forward warning unit according to claim 11 further comprising a forward processor, said forward processor providing a warning signal based upon an output of said doppler band pass filter.

15. A radar altimeter comprising:

at least one antenna for transmitting and receiving radar signals, said antenna configured to transmit a signal having a main lobe substantially towards the ground and at least one side lobe substantially aligned with a line of flight;

a range track channel configured to determine an altitude based on received returns of the main lobe; and a forward warning unit, said unit configured to receive and process radar side lobe returns having a positive doppler shift, said radar altimeter configured to determine a range to a forward object from the processed radar side lobe returns.

16. A radar altimeter according to claim 15 further comprising:

a doppler band pass filter; and a forward processor, said forward processor configured to provide a warning signal based upon an output of said doppler band pass filter.

17. A radar altimeter according to claim 15 wherein said forward warning unit is configured to suppress radar return signals having a negative doppler shift.

18. A forward warning unit comprising:

a range gate and correlator configured to receive radar return signals;

a correlation band pass filter configured to receive an output of said range gate and correlator;

a base band I/Q mixer configured to downsample an output of said correlation band pass filter to a doppler frequency; and a doppler band pass filter configured to filter an output of said base band I/Q mixer, said unit configured to only process radar side lobe return signals having a positive doppler shift.

19. A forward warning unit according to claim 18 wherein said doppler band pass filter comprises filter coefficients, said filter coefficients configured to cause said doppler band pass filter radar return signals having a positive doppler shift.

20. A forward warning unit according to claim 18 wherein said filter coefficients are configured to cause said filter to suppress radar return signals having a negative doppler shift.

* * * * *